T. E. STOCKFORD.
NUT LOCK.
APPLICATION FILED MAR. 29, 1910.
969,306.
Patented Sept. 6, 1910.
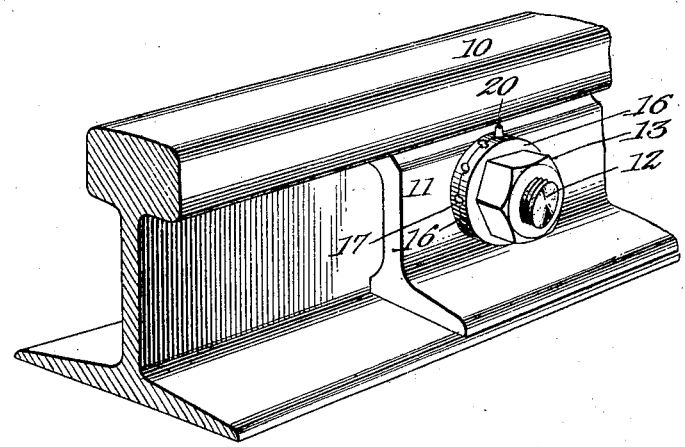
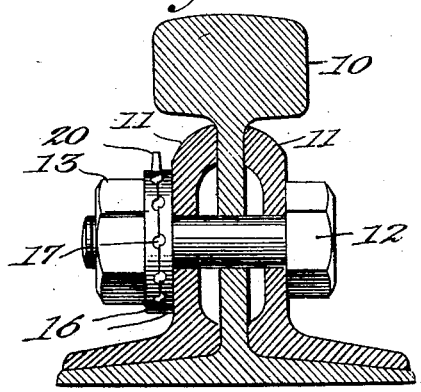
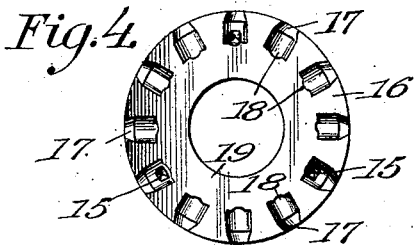
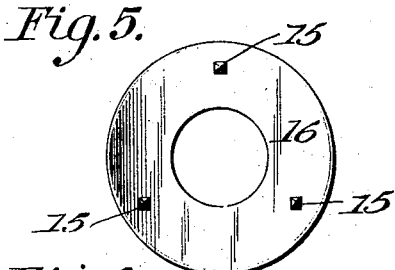
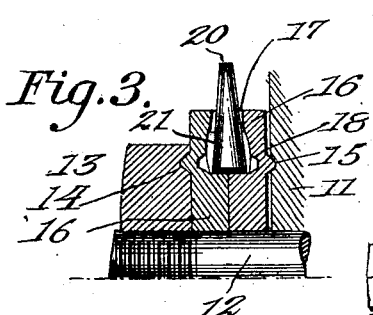
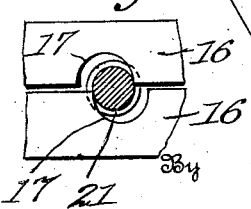
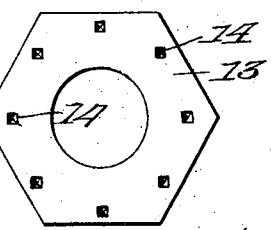
Witnesses
Inventor
Thomas E. Stockford.

UNITED STATES PATENT OFFICE.

THOMAS E. STOCKFORD, OF WILLIAMS, CALIFORNIA.

NUT-LOCK.

969,306.   Specification of Letters Patent.   Patented Sept. 6, 1910.

Application filed March 29, 1910. Serial No. 552,142.

*To all whom it may concern:*

Be it known that I, THOMAS E. STOCKFORD, a citizen of the United States, residing at Williams, county of Colusa, State of California, have invented certain new and useful Improvements in Nut-Locks, of which the following is a specification, reference being had therein to the accompanying drawing.

This invention relates to a nut lock and particularly to an improved construction of locking washer for retaining the nut in position.

The invention has for an object to provide a novel and improved construction of locking washer having a series of radially disposed recesses upon one face thereof enlarged at their inner ends and retaining spurs upon the opposite face to prevent rotative movement of the washer by their engagement with a contacting surface.

A further object of the invention is to provide a nut lock comprising parallel washers having upon their contacting faces a series of radially disposed recesses enlarged at their inner ends and adapted to receive a locking pin having an enlarged or head portion at one end to enter said recesses.

Other and further objects and advantages of the invention will be hereinafter set forth and the novel features thereof defined by the appended claims.

In the drawing, Figure 1 is a perspective showing the application of the invention; Fig. 2 is a vertical section; Fig. 3 is a detail section through the clamping washers; Fig. 4 is an elevation of the recessed face of a washer; Fig. 5 is a similar view of the opposite face; Fig. 6 is an elevation of the inner face of the nut after being used; and Fig. 7 is a detail section showing the washers in locked position.

Like numerals of reference refer to like parts in the several figures of the drawing.

The invention is applicable to any construction of nut and bolt but for the purpose of illustration is herein shown as applied to a rail 10 having the usual plates 11 at opposite sides thereof through which a bolt 12 passes. This bolt is of ordinary construction and is provided with a nut 13 which is smooth and when often used a series of recesses or depressions 14 are formed therein by the spurs or projections 15 upon one face of the washer 16 in order to provide a frictional engagement between the nut and washer so that they may be turned together. Other means for this purpose may be provided, if desired. The opposite face of the washer 16 is provided with a radially disposed series of recesses 17 extending inward from the periphery of the washer and enlarged at their inner ends 18. Beyond these recesses, the washer is provided with a plane portion 19. The spurs 15 are preferably located at the enlarged inner end 18 of the recesses and may be conveniently formed by stamping when the washer is produced. In the use of these washers for a nut lock, they are preferably disposed with the recessed faces in contact and when the recesses upon the adjacent plates are brought into alinement as the nut is tightened, a locking pin 20 is inserted therein as shown by Fig. 3. This pin may be of any preferred shape, for instance having an enlarged inner end 21 or other form of head to enter the enlarged portion of the recess.

In the operation of the invention, the parallel washers are disposed upon the bolt and the nut applied, one of the washers being held against rotation by frictional contact with the rail plate and the other rotates with the nut, being frictionally engaged therewith. The nut is then adjusted to tightly clamp all of the parts in contact and bring the recesses in the opposite washers into alinement when the locking pin is inserted with its larger end within the enlarged portion of the recesses. The nut is then turned in the opposite direction to partially throw the recesses out of alinement, thus providing a gripping contact at each side of the pin which effectually prevents any further movement of the nut. The nut can be removed by reversing this operation. Any desired number of recesses may be provided upon the washers and they can be conveniently formed by stamping operation which at the same time provides holding spurs upon the opposite face of the washer. By providing the recesses at the periphery of the washer, a continuous smooth bearing adjacent the bolt is secured and contact or injury to the thread thereof prevented.

The invention presents a simple, efficient and economically constructed locking washer adapted for application to any form of nut and bolt.

Having described my invention and set forth its merits, what I claim and desire to secure by Letters Patent is—

1. In a nut lock, parallel locking washers having a series of radially disposed conical recesses at the periphery of one face thereof and a plane bearing surface extending from said recesses to the aperture of said washers, retaining spurs upon the opposite face of said washers and a tapering locking pin of less diameter than said recesses when alined.

2. In a nut lock, a bolt, parallel washers thereon having upon their contacting faces a series of radially disposed recesses, enlarged at their inner ends, a nut engaging one of said washers, and a tapered locking pin disposed in alined recesses and normally of less diameter than said recesses when in alinement whereby a movement of the washers upon each other binds the pin within the recesses.

3. In a nut lock, a bolt, parallel washers disposed thereon and having upon their contacting faces a series of radially disposed recesses enlarged at their inner ends, a solid locking pin having an enlarged end of less diameter than said recesses when alined, and a nut mounted upon the bolt to engage said washers.

4. In a nut lock, a bolt, parallel washers disposed thereon and having upon their contacting faces a series of radially disposed segmental recesses enlarged at their inner ends, a solid locking pin having an enlarged end to enter said recesses when alined and normally of less diameter than the recesses when alined, spurs provided upon said washers opposite the enlarged portion of said recesses, and a clamping nut to engage the spurs upon one washer.

In testimony whereof I affix my signature in presence of two witnesses.

THOMAS E. STOCKFORD.

Witnesses:
B. B. FURY,
W. R. TURNER.